3,199,169
MULTIPLE SPINDLE MACHINE TOOL
Ludwig Weber, Beethovenstrasse 41, Reutlingen,
Baden-Wurttemberg, Germany
Filed Aug. 11, 1961, Ser. No. 130,932
Claims priority, application Germany, Aug. 25, 1960,
W 28,437
11 Claims. (Cl. 29—26)

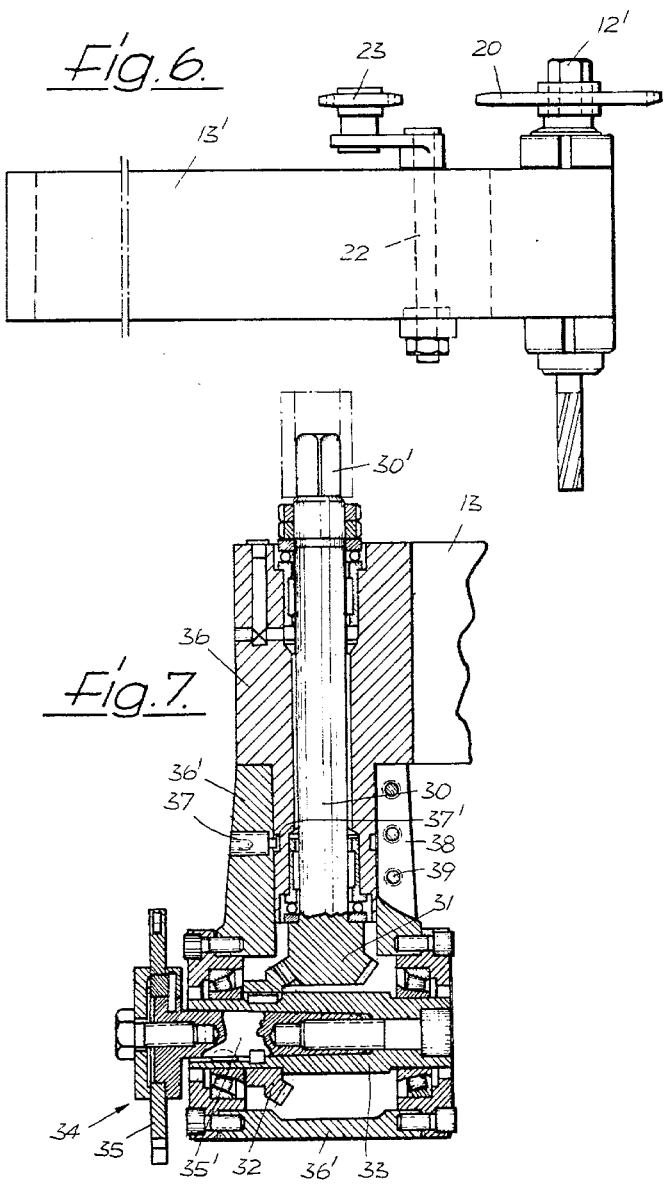

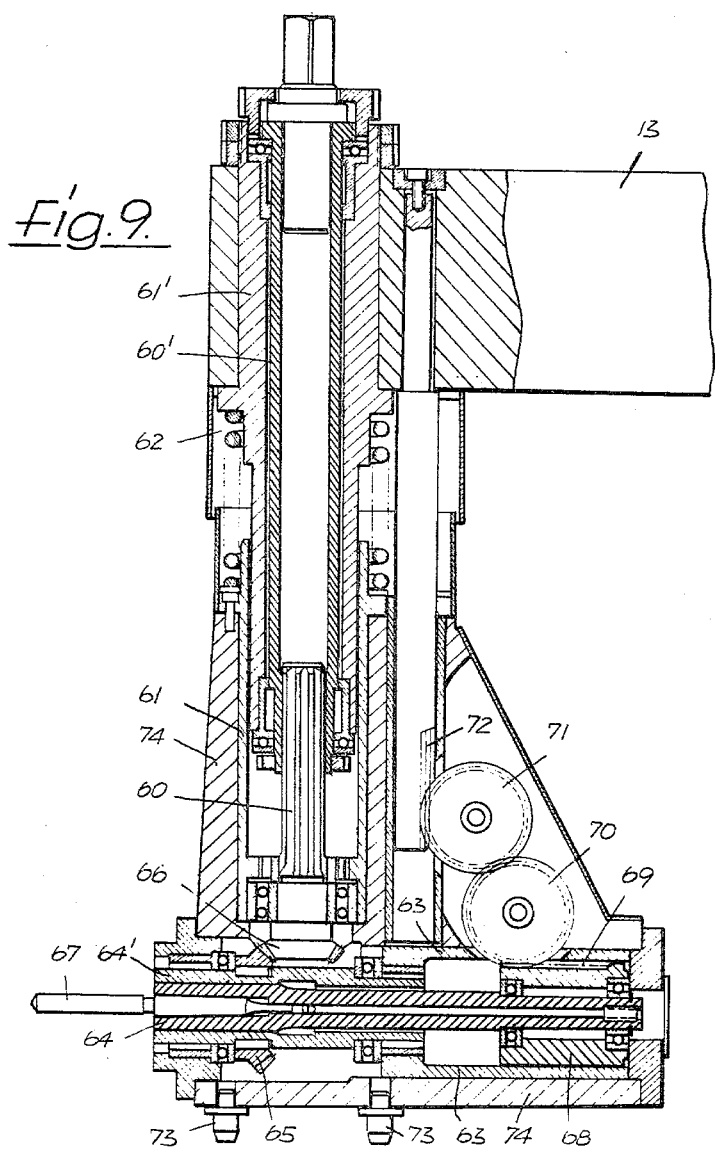

The present invention relates to a machine tool with a plurality of substantially parallel tool-carrying spindles, the individual spindle supports of which are mounted on a multiple-spindle unit which is adjustable relative to a work support in a direction parallel to the tool spindles.

In order to permit the distances between the individual tool spindles of this machine to be adjusted, these spindles are connected to telescopically adjustable universal-joint shafts, all of which are driven by a common nonadjustable drive unit. The known machine tools of this type are provided with tool spindles on or in which drills, taps, or reamers are to be mounted for machining a workpiece only in the feeding direction of the multiple-spindle unit. This means that either the work support is mounted in a fixed position and the bell-shaped housing containing the multiple-spindle unit is adjustable relative thereto or, vice versa, that this housing is mounted in a fixed position and the work support is movable relative thereto.

For the mass production of workpieces of one particular design it is also known to provide special machine tools, for example, automatic machines, which permit different cutting operations to be carried out simultaneously or successively on different sides of the workpiece. The design and construction of such a machine involves, however, a very great expense, and it is therefore economical only if the particular workpiece for which the machine is specially designed is produced in very large numbers.

It is an object of the present invention to provide a machine tool of the above-mentioned kind which has a plurality of tool spindles and may be manufactured in series, and which was previously designed only for drilling, tapping, and reaming operations and to modify such a machine tool so as to permit these as well as still other kinds of work to be carried out by means of a common drive on any kind of workpiece and in one or different directions and either simultaneously or successively. The operations which may be carried out by this machine may include, for example, milling work by means of end or side mills, cutting work by means of rotary saws, as well as drilling, tapping, reaming and similar work.

The above-mentioned object may be attained according to the invention by providing at least one additional tool support for at least one tool and the spindle thereof which operate in a direction different from the feeding direction of the multiple-spindle unit, and by providing suitable means for connecting this additional tool spindle to the common drive unit of all of the tool spindles. The invention therefore permits any conventional machine tool with several parallel tool spindles to be additionally equipped with tools which may operate in any desired direction so as to permit a workpiece to be machined on different sides by different tools or different kinds of tools either simultaneously or in successive operations.

According to one embodiment of the invention, this additional tool support is adapted to be connected with the work support of the machine, and the invention then further provides that the means for connecting the additional tool to the common drive unit comprise one member of a clutch, the other member of which is connected to an intermediate drive spindle which is adapted to be connected to one of the spindles of the multiple-spindle unit which is mounted in one of the adjustable spindle supports of this unit.

According to another embodiment of the invention, the tool support is likewise provided with an intermediate drive spindle which is adapted to engage into a spindle support of the multiple-spindle unit, and this intermediate spindle is adapted to be connected by means of a miter gear to a spindle or socket in which the tool is mounted. In order to permit this additional tool support to be used for driving a tool so as to move at an angle, for example, vertically to the parallel tool spindles of the multiple-spindle unit, for example, for drilling bores into the side walls of a workpiece, another feature of the invention provides that the work support and the multiple-spindle unit are movable relative to each other in a direction vertical to the axes of the tool spindles of the multiple-spindle unit. This has the special advantage that, even if no additional tool support is provided, the normal multiple-spindle machine tool may be utilized not only for machining a workpiece by means of drills, taps, or reamers, but also for carrying out milling operations, for example, by means of one or more end mills which are mounted in the parallel tool spindles of the multiple-spindle unit.

Although multiple-spindle machines for milling are generally known, the tool spindles of these prior machines are mounted at fixed distances from each other and can therefore be used only for machining workpieces of one particular design for which the machine is built. The last-mentioned feature of the invention has the advantage over these known machines that it permits several milling spindles to be adjusted so as to be disposed at any desired distances from each other, and that it also permits the milling operations to be carried out in any desired directions in accordance with the selected kind of movement between the multiple-spindle unit and the work support.

Another feature of the invention for producing the required feeding movement of the tool in a direction deviating from the feed direction of the multiple-spindle unit consists in the provision of a feed spindle which is operatively associated with the rear end of the tool socket and is adapted to be either connected to the intermediate drive spindle so as to be driven thereby or to be locked in a fixed position.

According to a further feature of the invention, the intermediate drive spindle within the tool support which may be conneccted to one of the spindles of the multiple-spindle unit may be divided into several parts which are telescopically slidable within each other against the action of a spring when the tool support is moved against the work support. This telescopic movement of the intermediate drive spindle is then transmitted through suitable means to the socket or spindle in which the tool is mounted so as to feed this spindle forwardly at the desired angle to the direction of the intermediate drive spindle. For this purpose, the tool support which likewise consists of two telescopically movable parts may be provided on the end carrying the tool spindle with stop members which are adapted to engage upon the work support to maintain the tool at the desired distance from the work support, and the movable end of the tool support is provided with a gear rack which transmits the feeding movement of the drive spindle through at least one gear to the tool spindle to feed the same forwardly at an angle to the direction of the intermediate drive spindle.

Inasmuch as the bell-shaped housing of the machine can only contain a limited number of universal-joint drive shafts, the invention further provides that the number of driving possibilities may be increased by connecting any one of these drive shafts with the intermediate drive shaft of one or more additional tool supports by means of a chain drive.

The above-mentioned as well as numerous other objects, features, and advantages of the present invention will become more clearly apparent from the following detailed description thereof, particularly when the same is read with reference to the accompanying drawings, in which FIGURE 1 shows a side view of one embodiment of a machine tool according to the invention;

FIGURE 6 shows a side view of a spindle support with a tool spindle which is to be driven by a chain drive; while FIGURES 7 to 9 show axial sections of three different embodiments of a tool support with a miter gear for the machine tool according to FIGURE 1.

Figure 1:
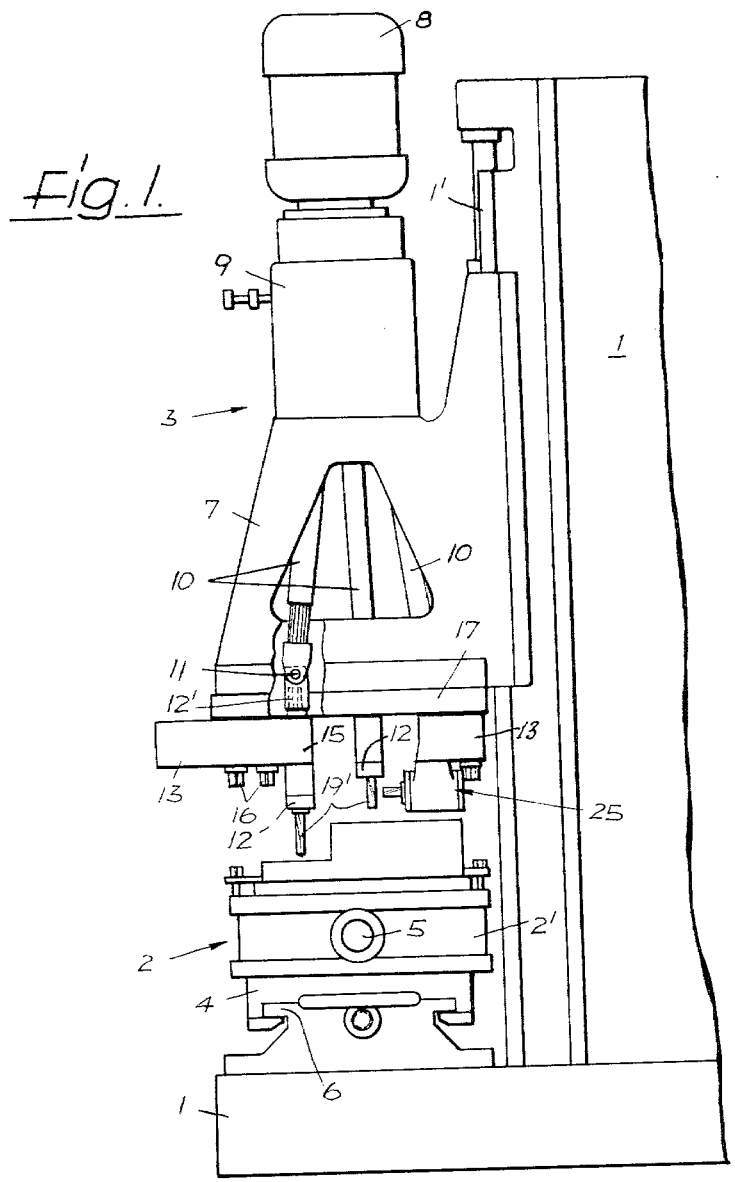

Referring to the drawings, and first particularly to FIGURE 1, the machine tool according to the invention comprises an upright or column 1, a worktable unit 2, and a multiple-spindle unit 3 which is movable upwardly and downwardly in vertical guides 1' on column 1. The worktable unit 2 comprises a slide 4 which is movable in a direction vertical to the plane of FIGURE 1, and on which the actual worktable 2' is mounted in a manner so as to be rotatable to different positions about its vertical axis by means of a shaft 5 and to be locked in any of the adjusted positions. In the particular embodiment of the invention as illustrated in FIGURE 1, a guide track 6 for supporting slide 4 is rigidly secured to the base of column 1. This guide track 6 may, however, also be adjustable in the vertical direction by suitable guides, not shown, similar to guides 1'. In this event, the multiple-spindle unit 3 may be rigidly secured to column 1, unless for special purposes both units, the multiple-spindle unit 3 as well as the worktable 2', may be made adjustable in the vertical direction.

Figure 5:
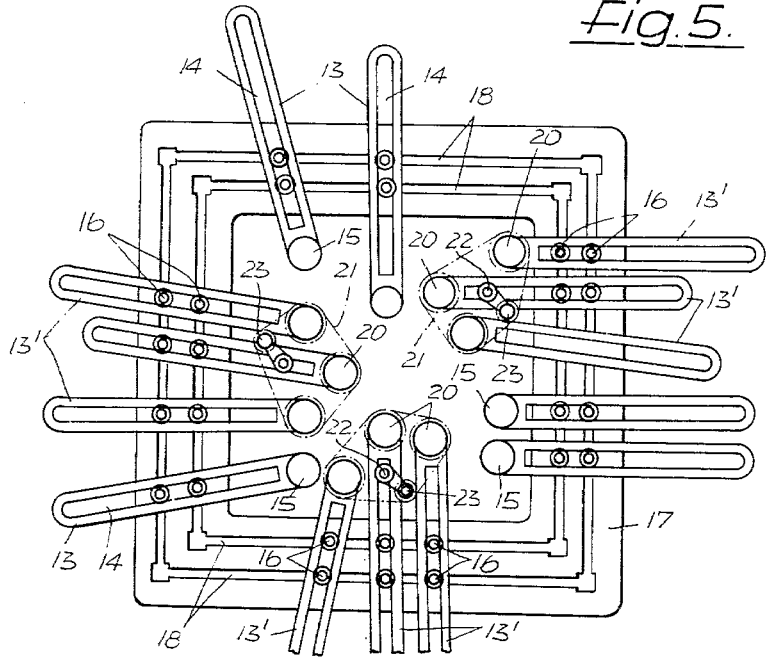
FIGURE 5 shows a view from below upon the frame of the machine tool according to FIGURE 1 which supports the tool spindles, and in which several spindles are driven by adjacent tool spindles which are driven by some of the universal-joint drive shafts of the machine yet leaving out a tool support for clearer showing.

The multiple-spindle unit 3 comprises a bell-shaped housing 7 on which an electric motor 8 is mounted which is connected by a gear unit 9 to several universal-joint shafts 10 for driving the same. Each shaft 10 is of a telescopic construction to permit its effective length to be varied, and it is connected at its opposite ends by universal joints 11 to a driving member in gear unit 9 and to a tool spindle 12, respectively. Tool spindles 12 are rotatably mounted in spindle supports 13. As illustrated particularly in FIGURE 5, each spindle support 13 forms an elongated element which is provided along almost its entire length with an aperture 14 and at one end with a bearing 15 for one of the tool spindles 12. The long slotlike aperture 14 in each spindle support 13 is provided for receiving bolts 16 for adjustably securing the respective spindle support to a frame 17 which, in turn, is rigidly secured to the lower end of the bell-shaped element 7 and is provided with several parallel slots 18 extending completely around frame 17. Although frame 17 is illustrated in FIGURE 5 as having two parallel slots 18 along each side thereof, it may also be provided with a larger number of such slots. By this connection of the spindle bearings 15 to the bell-shaped housing 7 by means of spindle supports 13 and frame 17 it is possible to adjust the various tool spindles to different positions and to different distances from each other.

Figure 3:
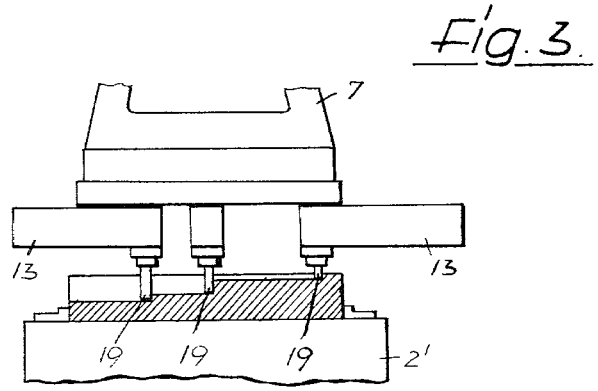
FIGURE 3 shows a part of the machine as illustrated in FIGURE 1 equipped for carrying out a staggered milling operation.
Figure 4:
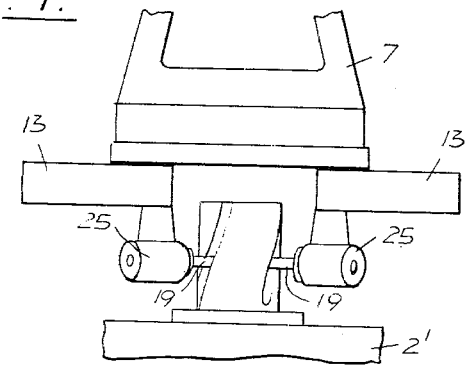
FIGURE 4 shows a view similar to FIGURE 3 of a part of the machine according to FIGURE 1 which is equipped with tool supports for milling several helical grooves simultaneously.

In order to attain the almost unlimited versatility of the machine tool according to the invention, the tool spindles 12 are designed so as to permit a variety of different tools to be mounted therein or thereon. Thus, work may be carried out not only by means of drills 19', taps, reamers or the like, but also by means of end mills, side mills, or the like. This is due to the fact that not only the multiple-spindle unit 3 is adjustable in a vertical direction relative to the worktable unit 2, but that the worktable 2' as such, by being horizontally slidable as well as rotatable about its vertical axis by means of shaft 5, may also be adjusted to various positions relative to spindle unit 3. It is therefore also possible to carry out a large variety of milling operations and even to utilize the machine for staggered milling by means of a series of end mills 19 as illustrated in FIGURE 3, or for milling simultaneously a plurality of vertical or helical slots, as illustrated in FIGURE 4. In an operation according to FIGURE 3, the worktable 2' is moved toward one side, while in an operation according to FIGURE 4 the spindle supports 13 and the worktable 2' are moved toward each other and the worktable is at the same time slowly turned about its vertical axis.

Since the space available within the bell-shaped housing 7 is limited, it is obviously only possible to provide therein a limited number of drive shafts 10. In order to permit the entire area within frame 17 to be utilized for mounting a larger number of tools than may be driven directly by drive shafts 10, tool spindles 12' which are mounted on some of the spindle supports 13' may, as shown in FIGURES 5 and 6, be provided with sprocket wheels 20. Several such sprocket wheels 20, for example, three, may then be connected to each other by a sprocket chain 21, and one of spindles 12' may be connected to one of the drive shafts 10 in the manner as illustrated in FIGURE 1. It is thus possible to utilize a single drive shaft 10 to drive simultaneously several, for example, three, tool spindles 12' by means of sprocket chain 21. In order to insure that chain 21 will always engage under the proper tension with sprocket wheels 20, one of the spindle supports 13' for the respective set of spindles 12' may be provided with a chain tightener of a conventional type, as shown particularly in FIGURE 6, consisting of a sprocket wheel 23 which is pivotable under the action of a spring, not shown, on a shaft 22 which is adjustably secured to the mentioned spindle support 13'. The proper chain tension will thus be attained by a suitable adjustment of shaft 22 on the respective spindle support 13' in combination with the tension of the spring which pivots sprocket wheel 23 into engagement with chain 21.

The machine according to the invention is also designed so as to permit any one of the spindle supports 13 to carry a tool, the rotary driving axis of which extends at an angle to the drive shafts of the multiple-spindle unit. For this purpose the respective tools are rotatably mounted in a tool support 25, as generally indicated in FIGURE 1, which is secured to a spindle support 13, and the tool may be connected to the respective drive shafts 10 by a set of gears which are disposed at an angle to each other. This tool support 25 may be of different designs, three of which are illustrated in FIGURES 7 to 9.

The tool support according to FIGURE 7 comprises an intermediate drive spindle 30, the upper end 30' of which may be connected to one of the drive spindles 10 or to a gear 20, while the lower end carries a bevel gear 31 which meshes with another bevel gear 32 which is rigidly secured to a shaft 33 which has a socket into which any suitable tool may be inserted. According to FIGURE 7, tool 34 consists of a milling disk 35 which is secured to a conical shaft 35' which, in turn, is removably mounted within the corresponding socket in shaft 33. In place of a milling disk 35, it is also possible to provide a circular saw or the like. The intermediate drive spindle 30 and tool shaft 33 are rotatably mounted in a bearing element 36 and a housing 36' which are connected in a manner so as to permit them to be turned together about the axis of drive spindle 30 and to be locked in any adjusted position. For this purpose, housing 36' may be connected to bushing 36 and prevented from sliding off the latter by screws 37 which engage into an annular groove 37' in bushing 36, and housing 36' may in addition be provided with a vertical slot 38 to permit it to be tightly clamped by means of screws 39 upon the reduced lower end of bushing 36 which, in turn, may be rigidly secured to a spindle support 13 in the same manner as the bearing for the other tool spindles 12.

Figure 8:
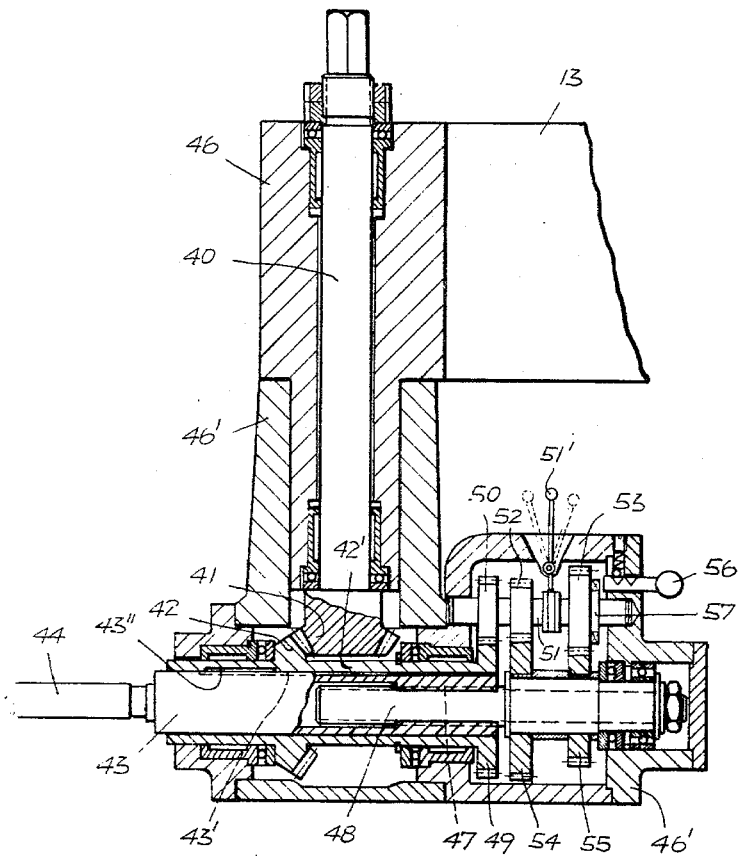

The tool support as illustrated in FIGURE 8 is substantially similar to the tool support according to FIGURE 7 insofar as the intermediate drive spindle 40 is likewise connected by means of a pair of bevel gears 41 and 42 to tool shaft 43 in which a suitable tool, for example, a drill 44, is mounted. However, tool shaft 43 is mounted within a bushing 42' in which it is slidable in the axial direction but prevented from rotating relative thereto by a splin 43" which slidably engages into a longitudinal groove 43' in tool shaft 43. This bushing 42' carrying bevel gear 42 is, in turn, rotatable but not slidable in the axial direction within a housing 46' which is mounted on the reduced tubular end of a bushing 46 on which it may be turned to and locked in different positions in a similar manner as housing 36' on bushing 36 in FIGURE 7. Also similarly, as shown in FIGURE 7, bushing 46 in which the connecting spindle 40 is rotatably mounted is adapted to be secured to one of the spindle supports 13.

Tool shaft 43 is provided in its rear end opposite to tool 44 with inner screw threads 47 into which the outer screw threads on a feed spindle 48 engage which is mounted in housing 46' so as to be rotatable but not slidable in the axial direction. For driving the feed spindle 48, bushing 42' which is driven by bevel gears 41 and 42 is provided with a gear 49 which meshes with a gear 50 which is rigidly secured to a shaft 51. This shaft 51 which extends parallel to feed spindle 48 and is rotatably mounted in housing 46' carries two further gears 52 and 53 of different diameters. These gears 52 and 53 are adapted to rotate freely on shaft 51 or to be alternately connected thereto by means of a suitable change clutch 51', as indicated diagrammatically. Gears 52 and 53 mesh with a pair of gears 54 and 55 which are likewise of different diameters and are rigidly mounted on feed spindle 48. Depending upon which of these gears 52 and 53 is connected by change clutch 51' to shaft 51, feed spindle 48 will be rotated either at a higher or lower speed than tool shaft 43 and will thus either advance or retract the tool 44. For tapping, a control pin 56 is provided which, when shifted inwardly, will engage with claws 57 on gear 53 and thereby lock gear 53 when the latter is disengaged from shaft 51, so that feed spindle 48 will also be locked. If clutch 51' is placed in the neutral position as shown and gear 52 is thus likewise disengaged from shaft 51, tool 44 will be either advanced or retracted, depending upon the direction of rotation of tool shaft 43, so that a tapping operation may then be carried out in accordance with the pitch of the screw threads on spindle 48.

The further modification of the tool support as illustrated in FIGURE 9 corresponds substantially to the embodiment as shown in FIGURE 7. It differs, however, therefrom insofar as the intermediate drive spindle consists of two parts 60 and 60' which are telescopicably slidable but nonrotatable relative to each other. The upper part 60' of this drive spindle is mounted in a tubular bushing 61' so as to be rotatable but no slidable in the axial direction relative thereto. The upper end of bushing 61' is adapted to be secured in a conventional manner to a spindle support 13, while its lower end engages into a bushing 61 which is secured within housing 74 and in which the lower part 60 of the connecting spindle is mounted so as to be rotatable but not slidable in the axial direction relative to bushing 61. The two bushings 61 and 61' are telescopically slidable within each other but are nonrotatably connected to each other, for example, by splines which are slidable in grooves and are also adapted to limit the extent of the telescopic movement. Bushings 61 and 61' are also connected to each other by a coil spring 62 which tends to maintain them in the extended position as shown in FIGURE 9.

The lower part of housing 74 contains a tubular member 63 which is rigidly secured thereto and the longitudinal axis of which extends vertically to the common longitudinal axis of bushing 61 and drive spindle 60, 60'. Similarly as in the tool support as shown in FIGURE 8, the tubular member 63 contains a tool shaft 64 which is slidable in the axial direction but nonrotatable within an intermediate bushing 64' on which a bevel gear 65 is rigidly secured. This bevel gear meshes with another bevel gear 66 which is secured to the lower end of the lower part 60 of the drive spindle. Bushing 64' is mounted in the tubular member 63 so as to be rotatable but not slidable in the axial direction relative thereto. The front end of tool shaft 64 is adapted to receive the shaft of a tool, for example, of a drill 67. The rear end of tool shaft 64 is mounted within a slide member 68 so as to be rotatable but not slidable in the axial direction relative thereto. This slide member 68 is slidable in the axial direction but not rotatable within member 63, and it is provided at its upper side with a gear rack 69 which meshes with a gear 70 which is rotatably mounted in housing 74. Gear 70 meshes with a further gear 71 which is likewise mounted in housing 74 and, in turn, meshes with a gear rack 72 which is rigdly secured to spindle support 13 or to the upper bushing 61'. The lower end of housing 74 is provided with projecting exchangeable stops 73 of a suitable length which are adapted to engage with the work support so that tool 67 will be disposed at the proper level for its operation on the workpiece.

As soon as the tool support as shown in FIGURE 9 approaches the work support and stops 73 engage upon the latter, the two telescopically connected parts 61 and 61' will be pushed together against the action of spring 62, whereby gear rack 72 will rotate gear 71 which through gear 70 then moves slide member 68 and thereby feeds tool 67 forwardly. Thus, the movement of the bell-shaped housing 7 which carries the tool support relative to work table 2' with the workpiece thereon also produces a feeding movement of tool 67 in a direction vertical to the relative movement between the bell-shaped housing 7 and worktable 2' so that, while other drills bore holes into the upper surface of the workpiece, drill 67 will drill holes at the same time into the lateral surfaces of the workpiece.

Figure 2:
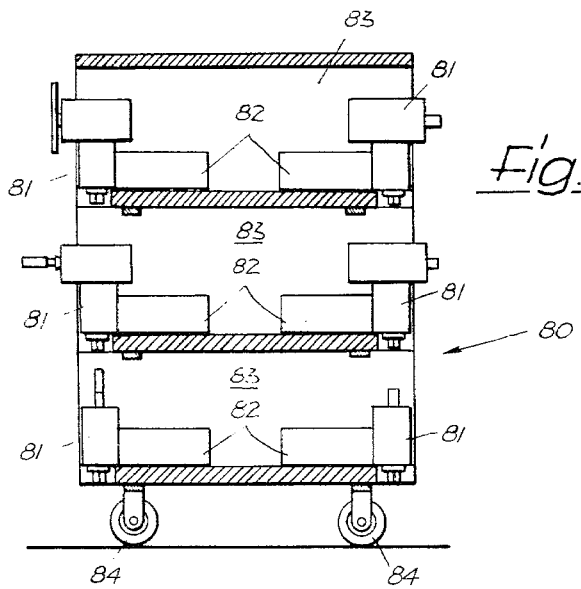
FIGURE 2 shows a vertical section of a mobile magazine for exchangeable tool supports of different types for the machine according to FIGURE 1.

FIGURE 2 illustrates an accessory for the machine tool acoerding to the invention in the form of a mobile magazine 80 which is designed to carry different exchangeable tool supports 81 and their spindle supports 82. This magazine which is easily movable on wheels 84 is provided with several compartments 83 which are easily accessible from the sides.

Although my invention has been illustrated and described with reference to the preferred embodiments thereof, I wish to have it understood that it is in no way limited to the details of such embodiments, but is capable of numerous modifications within the scope of the appended claims.

I claim:

1. A machine tool comprising, in combination, a multiple-spindle unit, said unit comprising a supporting element, a plurality of universal-joint shafts rotatably mounted on said supporting element, common means mounted on said supporting element for driving all of said shafts, a plurality of spindle supports mounted on said supporting element, means for adjusting said spindle supports to vary the distances from each other, each of said spindle supports being equipped with a spindle bearing, a plurality of parallel tool spindles, each of said tool spindles being rotatably mounted in the corresponding of said spindle bearings, and adapted to be connected to said shafts, a work support, means for moving said spindle unit and said work support relative to each other at least in a direction parallel to said tool spindles, at least one additional tool support adapted to be mounted on one of said spindle supports, means in said tool support for exchangeably mounting at least one tool and extending in a direction differing from the direction of said tool spindles, and means for connecting said tool mounting means to one of said tool spindles for driving said tool mounting means.

2. A machine tool comprising, in combination, a multiple-spindle unit, said unit comprising a supporting element, a pluraltiy of universal-joint shafts rotatably mounted on said supporting element, common means mounted on said supporting element for driving all of said shafts, a plurality of spindle supports mounted on said supporting element, means for adjusting said spindle supports to vary the distances from each other, each of said spindle supports being equipped with a spindle bearing, a plurality of parallel tool spindles, each of said tool spindles being rotatably mounted in the corresponding of said spindle bearings and adapted to be connected to said shafts, a work support, at least one additional tool support adapted to be mounted on one of said spindle supports, means in said tool support for exchangeably mounting at least one tool and extending in a direction differing from the direction of said tool spindles, means for connecting said tool mounting means to said driving means, said connecting means comprising a drive spindle adapted to be mounted in one of said spindle supports and to be connected to one of said tool spindles, and a pair of interengaging coupling members mounted on said drive spindle and on said tool mounting means, respectively, and means for moving said spindle unit and said work support relative to each other at least in a direction parallel to said tool spindles.

3. A machine tool comprising, in combination, a multiple-spindle unit, said unit comprising a housing, a plurality of universal-joint shafts within said housing, common means mounted on said housing for driving all of said shafts, a plurality of spindle supports mounted on said housing, means for adjusting said spindle supports to vary the distances between each other, each of said spindle supports being equipped with a spindle bearing, a plurality of parallel tool spindles, each of said tool spindles being rotatably mounted in the corresponding of one of said spindle bearings and connected to one of said shafts, a work support, means for moving said work support and said housing relative to each other in a direction parallel to said tool spindles, and at least one additional tool support comprising a second housing adapted to be mounted on one of said spindle supports, a drive spindle rotatably mounted within said second housing and adapted to be connected to one of said tool spindles, a tool shaft rotatably mounted within said second housing and extending at an angle to said drive spindle, means on said tool shaft for exchangeably mounting a tool thereon, and miter gear means connecting said drive spindle to said tool shaft for driving the same.

4. A machine tool comprising, in combination, a multiple-spindle unit, said unit comprising a housing, a plurality of universal-joint shafts within said housing, common means mounted on said housing for driving all of said shafts, a plurality of spindle supports mounted on said housing, means for adjusting said spindle supports to vary the distances between each other, each of said spindle supports being equipped with a spindle bearing, a plurality of parallel tool spindles, each of said tool spindles being rotatably mounted in the corresponding of one of said spindle bearings and connected to one of said shafts, a work support, means for moving said work support and said housing relative to each other in a direction parallel to said tool spindles, means for moving said work support and said housing relative to each other in a direction substantially at right angles to the axes of said tool spindles, and at least one additional tool support comprising a second housing adapted to be mounted on one of said spindle supports, a drive spindle rotatably mounted within said second housing and adapted to be connected to one of said tool spindles, a tool shaft rotatably mounted within said second housing and extending at an angle to said drive spindle, means on said tool shaft for exchangeably mounting a tool thereon, and miter gear means connecting said drive spindle to said tool shaft for driving the same.

5. A machine tool comprising, in combination, a multiple-spindle unit, said unit comprising a housing, a plurality of universal-joint shafts within said housing, common means mounted on said housing for driving all of said shafts, a plurality of spindle supports mounted on said housing, means for adjusting said spindle supports to vary the distances between each other, each of said spindle supports being equipped with a spindle bearing, a plurality of parallel tool spindles, each of said tool spindles being rotatably mounted in the corresponding of one of said spindle bearings and connected to one of said shafts, a work support, means for moving said work support and said housing relative to each other in a direction parallel to said tool spindles, and at least one additional tool support comprising a second housing adapted to be mounted on one of said spindle supports, a drive spindle rotatably mounted within said second housing and adapted to be connected to one of said tool spindles, a tool shaft rotatably mounted within said second housing and extending at an angle to said drive spindle, means on one end of said tool shaft for mounting a tool thereon, a feed spindle rotatably mounted within said second housing and operatively associated with the other end of said tool shaft, miter gear means connecting said drive spindle to said tool shaft, and control means for selectively connecting said feed spindle to said miter gear means at one time for moving said tool shaft in its axial direction and for disengaging said feed spindle from said miter gear means and for locking said feed spindle at another time.

6. A machine tool comprising, in combination, a multiple-spindle unit, said unit comprising a housing, a plurality of universal-joint shafts within said housing, common means mounted on said housing for driving all of said shafts, a plurality of spindle supports mounted on said housing, means for adjusting said spindle supports to vary the distances between each other, each of said spindle supports being equipped with a spindle bearing, a plurality of parallel tool spindles, each of said tool spindles being rotatably mounted in the corresponding of one of said spindle bearings and connected to one of said shafts, a work support, means for moving said work support and said housing relative to each other in a direction parallel to said tool spindles, and at least one additional tool support comprising a second housing adapted to be mounted on one of said spindle supports, a drive spindle rotatably mounted within said second housing and adapted to be connected to one of said tool spindles, a tool shaft rotatably mounted within said second housing and extending at an angle to said drive spindle, means on one end of said tool shaft for mounting a tool thereon, a feed spindle rotatably mounted within said second housing and operatively associated with the other end of said tool shaft, miter gear means connecting said drive spindle to said tool shaft, control means for selectively connecting said feed spindle to said miter gear means at one time for moving said tool shaft in its axial direction and for disengaging said feed spindle from said miter gear means and for locking said feed spindle at another time, and speed-change gear means for selectively rotating said feed spindle with at least two different speeds when said feed spindle is connected by said control means to said miter gear means.

7. A machine tool comprising, in combination, a multiple-spindle unit, said unit comprising a supporting element, a plurality of universal-joint shafts rotatably mounted on said supporting element, common means mounted on said supporting element for driving all of said shafts, a plurality of spindle supports mounted on said suporting element, means for adjusting said spindle supports to vary the distances from each other, each of said spindle supports being equipped with a spindle bearing, a plurality of parallel tool spindles, each of said tool spindles being rotatably mounted in the corresponding of said spindle bearings and adapted to be connected to said shafts, a work support, means for moving said spindle unit and said work support relative to each other at least in a direction parallel to said tool spindles, at least one additional tool support adapted to be mounted on one of said spindle supports and to be connected to said work support, means in said tool support for mounting at least one tool and extending in a direction differing from the direction of said tool spindles, means for connecting said tool mounting means to one of said tool spindles for driving said tool mounting means, said connecting means being variable in effective length, and means for moving said tool mounting means in a direction different from the direction of movement caused by said tool spindles.

8. A machine tool comprising, in combination, a multiple-spindle unit, said unit comprising a supporting element, a plurality of universal-joint shafts rotatably mounted on said supporting element, common means mounted on said supporting element for driving all of said shafts, a plurality of spindle supports mounted on said supporting element, means for adjusting said spindle supports to vary the distances between each other, each of said spindle supports being equipped with a spindle bearing, a plurality of parallel tool spindles each rotatably mounted on one of said spindle bearings and connected to one of said shafts, a work support, at least one additional tool support comprising a housing, a drive spindle within said housing and comprising at least two parts telescopically slidable along but nonrotatable relative to each other, the first of said drive spindle parts adapted to be rotatably mounted on one of said spindle supports and to be connected to one of said tool spindles, the second drive spindle part rotatably mounted in said housing, means for connecting said housing to said spindle support so as to be nonrotatable thereto but slidable in the axial direction of said drive spindle, a tool shaft rotatably mounted within said housing and extending at an angle to said drive spindle, spring means acting upon and tending to maintain said drive spindle parts in the extended position of said drive spindle, miter gear means connecting the second drive spindle part to said tool shaft for rotating the same, means for moving said spindle unit and said work support relative to each other in a direction parallel to said tool spindles, means on said housing adapted to engage with said work support and to maintain said housing at a certain distance from said work support when said spindle unit with said work support thereon and said work support are moved toward each other so that, when said relative movement is continued, said two drive spindle parts will be moved to a contracted position of said drive spindle against the action of said spring means, a slide member slidable within said housing and operatively connected to said tool shaft for sliding the same in the axial direction thereof, and means for transmitting the contracting and expanding movements of said drive spindle to said slide member for sliding said slide member and said tool shaft in the axial feeding and retracting direction thereof, respectively.

9. A machine tool comprising, in combination, a multiple-spindle unit, said unit comprising a supporting element, a plurality of universal-joint shafts rotatably mounted on said supporting element, common means mounted on said supporting element for driving all of said shafts, a plurality of spindle supports mounted on said supporting element, means for adjusting said spindle supports to vary the distances between each other, each of said spindle supports being equipped with a spindle bearing, a plurality of parallel tool spindles, each of said tool spindles being rotatably mounted in the corresponding of one of said spindle bearings and connected to one of said shafts, a work support, at least one additional tool support comprising a housing, a drive spindle within said housing and comprising at least two parts telescopically slidable along but nonrotatable relative to each other, the first of said drive spindle parts adapted to be rotatably mounted on one of said spindle supports and to be connected to one of said tool spindles, the second drive spindle part rotatably mounted in said housing, means for connecting said housing to said spindle support so as to be nonrotatable thereto but slidable in the axial direction of said drive spindle, a tool shaft rotatably mounted within said housing and extending at an angle to said drive spindle, miter gear means connecting the second drive spindle part to said tool shaft for rotating the same, means for connecting said housing to said work support, means for moving said spindle unit and said work support relative to each other in a direction parallel to said tool spindles, and for thereby moving said drive spindle parts to a contracted position of said drive spindle when said spindle unit and said work support are moved toward each other and for moving said drive spindle parts to an extended position of said drive spindle when said spindle unit and said work support are moved away from each other, a slide member slidable within said housing and operatively connected to said tool shaft for sliding the same in the axial direction thereof, and means for transmitting the contracting and expanding movements of said drive spindle to said slide member for sliding said slide member and said tool shaft in the axial feeding and retracting directions thereof, respectively.

10. A machine tool comprising, in combination, a multiple-spindle unit, said unit comprising a supporting element, a plurality of universal-joint shafts rotatably mounted on said supporting element, common means mounted on said supporting element for driving all of said shafts, a plurality of spindle supports mounted on said supporting element, means for adjusting said spindle supports to vary the distances between each other, each of said spindle supports being equipped with a spindle bearing, a plurality of parallel tool spindles, each of said tool spindles being rotatably mounted in the corresponding of one of said spindle bearings and connected to one of said shafts, a work support, at least one additional tool support comprising a housing, a drive spindle within said housing and comprising at least two parts telescopically slidable along but nonrotatable relative to each other, the first of said drive spindle parts adapted to be rotatably mounted on one of said spindle supports and to be connected to one of said tool spindles, the second drive spindle part rotatably mounted in said housing, means for connecting said housing to said spindle support so as to be nonrotatable thereto but slidable in the axial direction of said drive spindle, a tool shaft rotatably mounted within said housing and extending at an angle to said drive spindle, miter gear means connecting the second drive spindle part to said tool shaft for rotating the same, means for connecting said housing to said work support, means for moving said spindle unit and said work support relative to each other in a direction parallel to said tool spindles, and for thereby moving said drive spindle parts to a contracted position of said drive spindle when said spindle unit and said work support are moved toward each other and for moving said drive spindle when said spindle unit and said work support are moved away from each other, a slide member slidable within said housing and operatively connected to said tool shaft for sliding the same in the axial direction thereof, a gear rack on said slide member, a second gear rack adapted to be secured to said spindle support, and at least one gear interposed between said gear racks and rotatably mounted in said housing for transmitting the contracting and expanding movements of said drive spindle to said slide member for sliding said slide member and said tool shaft in the axial feeding and retracting directions thereof, respectively.

11. A machine tool comprising, in combination, a multiple-spindle unit, said unit comprising a supporting element, a plurality of universal-joint shafts rotatably mounted on said supporting element, common means mounted on said supporting element for driving all of said shafts, a plurality of spindle supports mounted on said supporting element, means for adjusting said spindle supports to vary the distances from each other, each of said spindle supports being equipped with a spindle bearing, a plurality of parallel tool spindles, greater than the number of said shafts, each of said tool spindles being rotatably mounted in the corresponding of said spindle supports, some of said tool spindles adapted to be connected to said shafts to be directly driven thereby, at least one chain drive connecting at least one of said driven tool spindles to at least one additional tool spindle for driving the same, and at least one of said spindle supports including chain tightening means.

References Cited by the Examiner
UNITED STATES PATENTS

| | | | |
|---|---|---|---|
| 365,850 | 7/87 | O'Neil | 77—55 |
| 650,795 | 5/00 | Maxwell | 77—55 |
| 856,306 | 6/07 | Smith | 90—17 |
| 1,012,024 | 12/11 | Stephenson | 77—24.1 |
| 1,246,250 | 11/17 | Eisler | 77—24 |
| 2,183,166 | 12/39 | Palumbo | 90—17 |
| 2,601,541 | 6/52 | Maxwell | 77—58.35 |
| 2,669,162 | 2/54 | Arliss | 90—17 |
| 2,901,946 | 9/59 | Grabes | 77—34.2 |

RICHARD H. EANES, Jr., *Primary Examiner.*